(12) United States Patent
Balani et al.

(10) Patent No.: US 10,339,453 B2
(45) Date of Patent: Jul. 2, 2019

(54) AUTOMATICALLY GENERATING TEST/TRAINING QUESTIONS AND ANSWERS THROUGH PATTERN BASED ANALYSIS AND NATURAL LANGUAGE PROCESSING TECHNIQUES ON THE GIVEN CORPUS FOR QUICK DOMAIN ADAPTATION

(71) Applicant: International Business Machines Corporation, Armonk, NY (US)

(72) Inventors: Naveen G. Balani, Mumbai (IN); Amit P. Bohra, Pune (IN); Krishna Kummamuru, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 14/139,589

(22) Filed: Dec. 23, 2013

(65) Prior Publication Data

US 2015/0178623 A1 Jun. 25, 2015

(51) Int. Cl.
*G06N 5/02* (2006.01)
*G06F 17/00* (2019.01)

(52) U.S. Cl.
CPC .................... *G06N 5/025* (2013.01)

(58) Field of Classification Search
CPC ...... G06N 5/047; G06N 99/005; G06N 5/046; G06N 5/02; G06F 17/30985
USPC ........................................ 706/48
See application file for complete search history.

(56) References Cited

U.S. PATENT DOCUMENTS

| | | | | |
|---|---|---|---|---|
| 7,349,899 | B2* | 3/2008 | Namba | G06F 17/3071 |
| 8,983,977 | B2* | 3/2015 | Ishikawa | G06F 17/30654 707/750 |
| 2004/0167875 | A1* | 8/2004 | Sneiders | G06F 17/3043 |
| 2004/0254917 | A1* | 12/2004 | Brill | G06F 17/30654 |
| 2006/0230008 | A1* | 10/2006 | Burgener | G09B 7/02 706/25 |
| 2009/0012926 | A1* | 1/2009 | Ishikawa | G06F 17/30654 706/47 |
| 2009/0119584 | A1* | 5/2009 | Herbst | G06F 17/30734 715/273 |

(Continued)

OTHER PUBLICATIONS

Brown, Jonathan C. et al., "Automatic Question Generation for Vocabulary Assessment", Proceedings of Human Language Technology Conference and Conference on Empirical Methods in Natural Language Processing, , pp. 819-826, Vancouver, Oct. 2005; http://dl.acm.org/citation.cfm?id=1220678.

Cramer, Irene et al., "Building an Evaluation Corpus for German Question Answering by Harvesting Wikipedia", In Proceedings of The Fifth International Conference on Language Resources and Evaluation (LREC) (2006), 6 pages; http://www.lsv.uni-saarland.de/CraLei06.pdf.

(Continued)

*Primary Examiner* — Scott A. Waldron
*Assistant Examiner* — Viker A Lamardo
(74) *Attorney, Agent, or Firm* — Stephen R. Tkacs; Stephen J. Walder, Jr.; Reza Sarbakhsh

(57) ABSTRACT

A mechanism is provided in a data processing system for automatically generating question and answer pairs for training a question answering system for a given domain. The mechanism identifies a set of patterns of components in passages within a corpus of documents for the given domain. The mechanism identifies a set of rules that correspond to the set of patterns for generating question and answer pairs from the passages within the corpus of documents. The mechanism applies the set of rules to the passages to generate the question and answer pairs.

15 Claims, 4 Drawing Sheets

(56) References Cited

U.S. PATENT DOCUMENTS

| | | | |
|---|---|---|---|
| 2009/0276161 A1* | 11/2009 | Cobain | G06F 19/3431 702/19 |
| 2009/0287678 A1 | 11/2009 | Brown et al. | |
| 2010/0010803 A1* | 1/2010 | Ishikawa | G06F 17/28 704/9 |
| 2010/0235311 A1* | 9/2010 | Cao | G06F 17/30867 706/46 |
| 2011/0066587 A1 | 3/2011 | Ferrucci et al. | |
| 2011/0125734 A1* | 5/2011 | Duboue | G09B 7/00 707/723 |
| 2012/0077178 A1 | 3/2012 | Bagchi et al. | |
| 2012/0084112 A1* | 4/2012 | Bagchi | G06Q 10/063112 705/7.14 |
| 2013/0007033 A1 | 1/2013 | Brown et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0268534 A1* | 10/2013 | Mathew | G06F 17/30705 707/740 |
| 2014/0039873 A1* | 2/2014 | Li | G06F 17/2854 704/2 |

OTHER PUBLICATIONS

High, Rob, "The Era of Cognitive Systems: An Inside Look at IBM Watson and How it Works", IBM Corporation, Redbooks, 2012, 16 pages.

Soricut, Radu et al., "Automatic Question Answering: Beyond the Factoid", In Proceedings of the HLT/NAACL 2004: Main Conference (2004), 8 pages; http://acl.ldc.upenn.edu/hlt-naacl2004/main/pdf/104_Paper.pdf.

Tomas, David et al., "TrainQA: a Training Corpus for Corpus-Based Question Answering Systems", http://polibits.gelbukh.com/2009_40/40_01.pdf, Manuscript received Nov. 23, 2008. Manuscript accepted for publication Aug. 15, 2009, 7 pages.

Yuan, Michael J., "Watson and healthcare, How natural language processing and semantic search could revolutionize clinical decision support", IBM developerWorks, IBM Corporation, Apr. 12, 2011, 14 pages.

Magnini, Bernardo et al., "Creating the DISEQuA Corpus: a Test Set for Multilingual Question Answering", 4th Workshop of the Cross-Language Evaluation Forum, CLEF 2003, Trondheim, Norway, Aug. 21-22, 2003; http://eprints.ucm.es/5535/1/37.pdf, 10 pages.

* cited by examiner

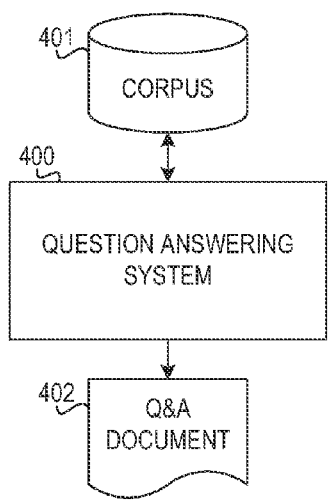
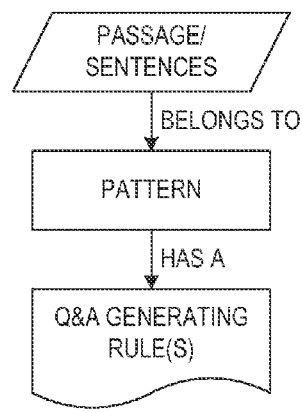
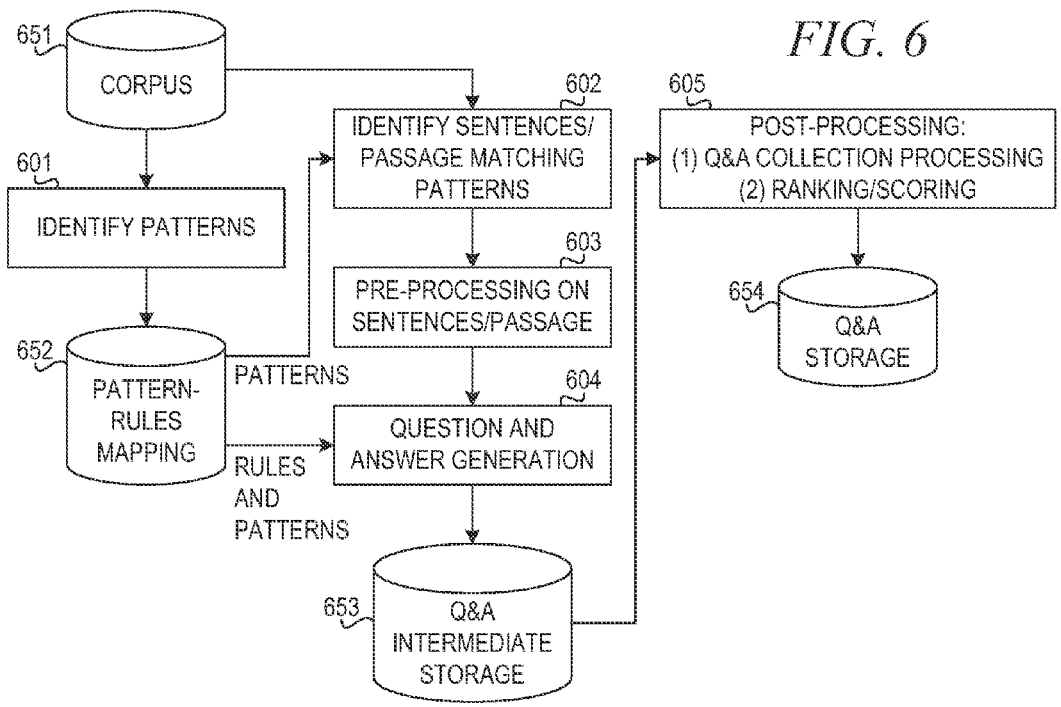

AUTOMATICALLY GENERATING TEST/TRAINING QUESTIONS AND ANSWERS THROUGH PATTERN BASED ANALYSIS AND NATURAL LANGUAGE PROCESSING TECHNIQUES ON THE GIVEN CORPUS FOR QUICK DOMAIN ADAPTATION

BACKGROUND

The present application relates generally to an improved data processing apparatus and method and more specifically to mechanisms for automatically generating test/training questions and answers through pattern based analysis and natural language processing techniques on the given corpus for quick domain adaptation.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for automatically generating question and answer pairs for training a question answering system for a given domain. The method comprises identifying a set of patterns of components in passages within a corpus of documents for the given domain. The method further comprises identifying a set of rules that correspond to the set of patterns for generating question and answer pairs from the passages within the corpus of documents. The method further comprises applying the set of rules to the passages to generate the question and answer pairs.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a block diagram illustrating a system for automatically generating test/training questions and answers from a given corpus in accordance with an illustrative embodiment;

FIG. 5 illustrates relationships between passages in the corpus and question and answer generating rules in accordance with an illustrative embodiment;

FIG. 6 is a block diagram illustrating automatic generation of test/training questions and answers from a given corpus in accordance with an illustrative embodiment.

DETAILED DESCRIPTION

The illustrative embodiments provide a mechanism for automatically generating testing/training questions and answers by performing pattern based analysis and natural language processing techniques on the given corpus for quick domain adaptation. When building and adapting a Question and Answer (QA) system for a new domain, it is necessary to provide test and training questions and answers. Existing solutions for generating test and training questions and answers are manual and require collaboration with clients or different teams of personnel. This procedure is time consuming and inefficient. Even in cases where scripts are used to generate questions and answers, the process generates a lot of noise. There are also crowd-sourcing techniques to collect questions and answers that could miss questions and answers corresponding to some topics.

The illustrative embodiments identify passages that belong to one or more recognized patterns and uses those passages to generate testing/training questions and answers. The illustrative embodiments create rules for generating the questions and answers given the passages as the input. The mechanism of the illustrative embodiments performs automatic pattern identification and filtering based on the domain to remove noise. The mechanism ranks the questions and answers as a post-processing step and then selects the top questions and answers to be used for testing/training. These top questions are then be provided to test or train the question and answer system for the particular domain of the corpus.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 1:
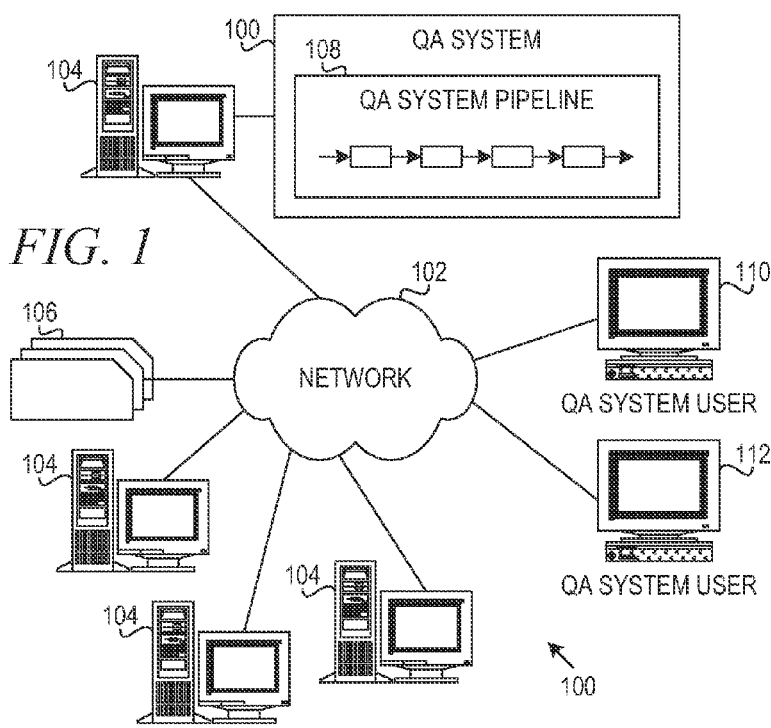
FIG. 1 depicts a schematic diagram of one illustrative embodiment of a question/answer creation (QA) system in a computer network.
Figure 2:
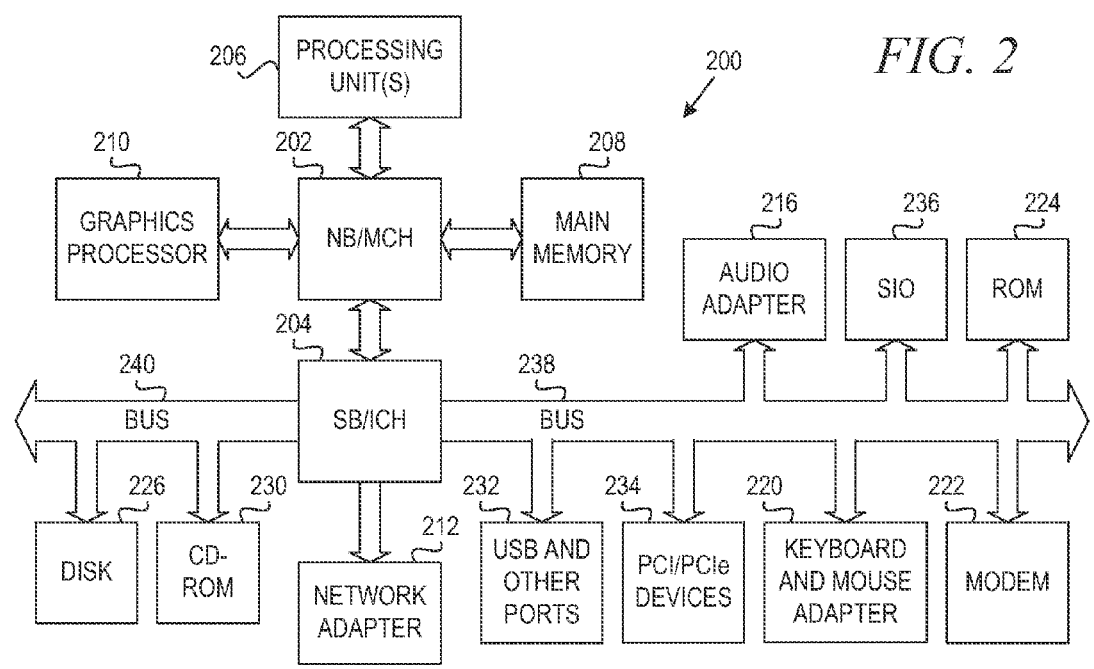
FIG. 2 is a block diagram of an example data processing system in which aspects of the illustrative embodiments may be implemented.
Figure 3:
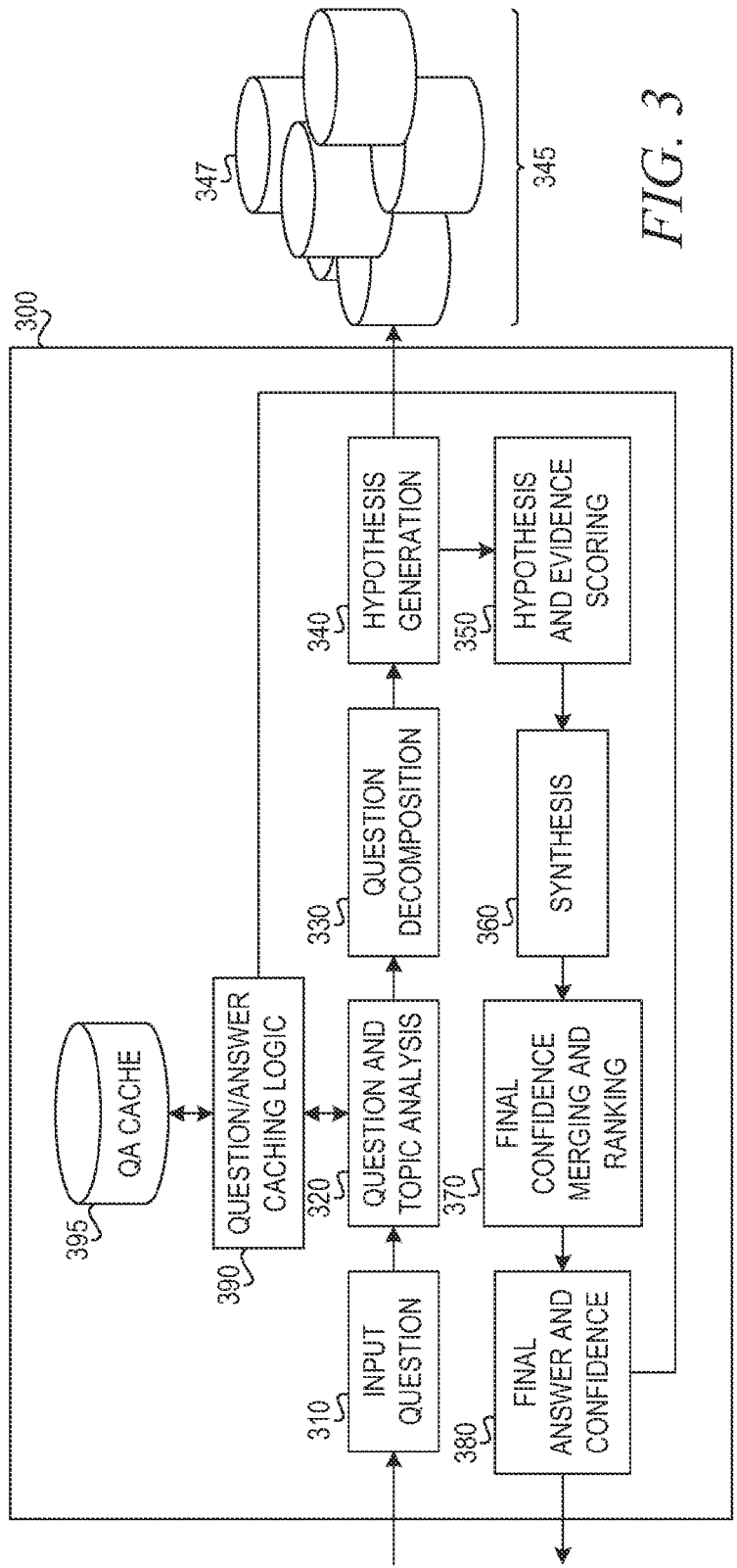
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e., the question and topic analysis stage 320, parses the input question using natural language processing (NLP) techniques to extract major features from the input question, classify the major features according to types, e.g., names, dates, or any of a plethora of other defined topics. For example, in the example question above, the term "who" is associated with a topic for "persons" indicating that the identity of a person is being sought, "Washington" is identified as a proper name of a person with which the question is associated, "closest" is identified as a word indicative of proximity or relationship, and "advisors" is indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

FIG. 4 is a block diagram illustrating a system for automatically generating test/training questions and answers from a given corpus in accordance with an illustrative embodiment. Question answering (QA) system 400 receives corpus 401 and performs pattern based analysis and natural language processing techniques on corpus 401. In addition to answering questions, QA system 400 is adapted to generate question and answer pairs using the approach of the illustrative embodiments.

A pattern may comprise parts of speech, concepts or ideas, types of words or phrases, keywords, entities, etc. For example, a pattern may be based on a noun phrase or, more specifically, a person, a place, a proper noun, a job title, etc. A pattern may be based on such a noun phrase being the subject or object of a sentence. A pattern may be based on a verb phrase or a particular type of verb. A pattern may be based on temporal qualifiers or other types of qualifiers. QA system 400 identifies the most frequently occurring patterns of passages/sentences using unsupervised techniques. Alternatively, QA system 400 is bootstrapped with a predetermined set of patterns for a given domain.

QA system 400 identifies sentences, clauses, phrases, or longer passages in corpus 401 that belong to predetermined patterns. For example, consider the following sentence: All regular employees are eligible for 22 days of privilege leave every year. In this example, QA system 400 identifies "all regular employees" as a noun phrase, "are" as a verb, "eligible" as an adjective, "for" as a preposition, "22 days" as an amount of time, "of" as a preposition, "privilege leave" as a noun phrase, and "every year" as a recurring time value. Generally, QA system 400 then identifies the pattern, "(noun phrase) (is/are) (adjective)," and the pattern, "(amount) of (noun phrase)." More specifically, QA system 400 may identify the pattern, "(amount) of (noun phrase) (recurring time value)."

QA system 400 performs automatic pattern identification and performs filtering based on the domain of corpus 401 to remove noise. In one embodiment, the set of patterns is bootstrapped using a set of patterns provided by a user. QA system 400 identifies the most frequently occurring patterns of passages using unsupervised techniques. QA system 400 then automatically filters the patterns. In one example embodiment, a domain expert performs manual filtering of the patterns. In an alternative embodiment, QA system 400 performs automatic filtering based on a domain dictionary. This filtering removes frequently occurring patterns that are unlikely to result in meaningful questions for testing or training the QA system 400.

QA system 400 uses those passages to generate test/training questions and answers. QA system 400 generates rules to be used for generating the questions and answers given the passages in corpus 401. QA system 400 also stores a set of predefined rules for generic patterns; however, in one embodiment, a domain expert creates the rules based on the patterns themselves to tailor the rules for the given domain. The domain expert then associates the rules with the identified patterns in a pattern-rules mapping storage.

In the above example, consider the pattern, "(noun phrase) (is/are) (adjective)" has a rule to form a question of "who (is/are) (adjective)?" or "(noun phrase) (is are) what?" The former rule would result in the following questions: Who is eligible for 22 days of privilege leave every year? Consider the pattern, "(amount) of (noun phrase)," has a rule to form a question of "how many (noun phrase)?" This rule would result in the following question: How many days of privilege leave every year are all regular employees eligible? Consider the pattern, "(amount) of (noun phrase) (recurring time value)," has a rule to form a question of "how often (amount) of (noun phrase)?" This rule would result in the following question: How often are all regular employees eligible for 22 days of privilege leave?

QA system 400 then performs ranking of the questions and answers as post-processing and selects the top questions and answers to form Q&A document 402. Thus, QA system 400 prunes the set of questions and answers by ranking them using various features of the questions and answers or by merging similar or redundant questions and answers. QA system 400 selects the top questions and answers using a predetermined threshold, for instance.

FIG. 5 illustrates relationships between passages in the corpus and question and answer generating rules in accordance with an illustrative embodiment. The mechanism of the illustrative embodiment recognizes a passage, comprising one or more sentences, phrases, or clauses, for example, that belongs to a pattern. As described above, a pattern is a combination of components that occurs frequently in a corpus. Such components include particular parts of speech, grammatical components, concepts, and keywords.

In one embodiment, the mechanism automatically identifies the patterns based on the input corpus. The mechanism annotates the passages of the corpus to mark the components. The mechanism then identifies the combinations of components that occur frequently. In one embodiment, a domain expert selects a set of tokens having some relationship between them. Seeding the mechanism of the illustrative embodiment with the selected set of tokens, the mechanism retrieves passages that have those tokens and identifies patterns to which those passages belong. The mechanism then retrieves more passages based on the identified pattern. Based on statistical information, such as the number of instances, the mechanism selects a pattern that occurs frequently, for example, as a pattern for question and answer generation. For example, if the pattern, "(amount) of (noun phrase) (recurring time value)" occurs frequently in the corpus, then the mechanism identifies this pattern as a pattern to be associated with a rule. In an alternative embodiment, a domain expert may provide a set of known patterns for that domain. Also, a combination of known patterns and automatically identified patterns may be used.

A domain expert then manually filters the patterns. For example, a domain expert may examine the identified patterns and eliminate passages that do not have useful information based on the expert's knowledge of the domain. Alternatively, the mechanism automatically filters the patterns based on a domain dictionary. For instance, if certain terms are identified as synonymous in the domain dictionary, then the mechanism marks patterns containing the synonymous terms as related or eliminates redundant passages. Also, the mechanism annotates the passages according to the domain dictionary to allow for improved pattern identification. A combination of automatic filtering and manual filtering may also be used.

As shown in FIG. 5, each pattern has an associated set of question and answer generating rules. The question and answer generating rules help in forming the question and answer from the given text of the passage belonging to the pattern. The mechanism stores each pattern and its associated set of rules for generating questions and answers.

FIG. 6 is a block diagram illustrating a mechanism for automatic generation of test/training questions and answers from a given corpus in accordance with an illustrative embodiment. In block 601, the mechanism uses corpus 651 to identify patterns. As described above, the mechanism identifies and filters these patterns using a combination of automatic and manual techniques. The mechanism also determines question and answer generating rules for the identified patterns. The patterns may comprise words, part-of-speech tags, named entities, subject-predicate relations, etc. The mechanism stores the patterns and associated question and answer generating rules in pattern-rules mapping storage 652.

In block 602, the mechanism identifies sentences or passages that match the patterns in pattern-rules mapping storage 652. Then, the mechanism performs pre-processing on the identified sentences or passages in block 603. The mechanism filters the patterns of passages based on information selected from a group consisting of manual by a domain expert, automatic utilizing a dictionary, and recursively utilizing tokens, relationships, and retrieving passages.

Various techniques, such as pronoun disambiguation, anaphora resolution, lexical databases, etc., are used to generate different types of questions and answers. For example, WordNet is a lexical database for the English language. The WordNet database groups English words into sets of synonyms called synsets, provides short, general definitions, and records the various semantic relations between these synonym sets. WordNet produces a combination of dictionary and thesaurus that is more intuitively usable and supports automatic text analysis and artificial intelligence applications. As another example, Freebase is an example of a large collaborative knowledge base consisting of metadata composed mainly by its community members. Freebase is an online collection of structured data harvested from many sources.

The mechanism uses the passage and metadata attributes to select the set of passages to be used for generating the questions and answers. The metadata attributes the mechanism generates are used as features when doing training. Metadata attributes are collected based on the syntactic and semantic clues from the document and the passage. Examples of metadata could be position of passage in the document (line number for instance), size of passage compared to the size of document, relative number of named entities present in the passage vs. document, and so on. Some of these metadata could become the feature/criteria for selecting the question and answer. Also such additional features could be clubbed with the features that are extracted from question and answer at the time of training a QA system to generate the final model. For training a QA system, the system is given questions and answers and then it extracts features from such questions and answers. The metadata collected above would be clubbed with features which are extracted here.

In block 604, the mechanism generates questions and answers based on the identified passages, the matching patterns, and the associated question and answer generating rules. Pre-processing prepares the passages for application of the question and answer generating rules. The mechanism then stores the generated questions and answers in Q&A intermediate storage 653.

In block 605, the mechanism performs post-processing. In one embodiment, post-processing includes ordering questions by similarity, merging similar questions with the same answer, scoring similar questions with different answers, and applying an analytic algorithm to the similar questions to resolve conflicts and generate new questions. The mechanism filters and ranks the questions and answers from Q&A intermediate storage 653 using the input corpus 651 to identify important questions and answers to be selected for training. The mechanism uses metadata attributes that were generated during the pre-processing of block 603. The mechanism also ensures that document coverage is high while selecting the questions and answers as the final output. For example, the mechanism filters using the number of occurrences in the input corpus 651, such as frequency of particular terms in the corpus 651. The mechanism also ranks using coverage across the documents of keywords from the question and answer text.

In one embodiment, post-processing comprises ordering questions by similarity, merging similar questions with the same answer, scoring or ranking similar questions with different answers, and applying an analytic algorithm to the similar questions to resolve conflicts and generate new questions.

The mechanism stores the resulting questions and answers in Q&A storage 654 as the final output.

As a specific example, a sentence in a given corpus may have a numerical followed by a time qualifier (e.g., day, year, hour, etc.). More specifically, consider the following two sentences:

(1) All regular employees are eligible for 22 days of privilege leave every year.

(2) Employees are permitted to carry forward up to 12 days of privilege leave to the next year.

A rule specific to the pattern may be as follows:

Question type to generate: "How many";
Question template to generate: How many {0} {1} {2}?;
Answer value: numerical present in the sentence;
Filters: 0—Time qualifier value in the sentence; 1—Predicate (modified); 2—Subject (modified).

The questions and answers generated may be as follows:

1. Question—"How many" "days" "of privilege leave every year" "all regular employees are eligible for"? Answer—22;

2. Question—"How many" "days" "of privilege leave" "employees are permitted to carry forward"? Answer—12.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
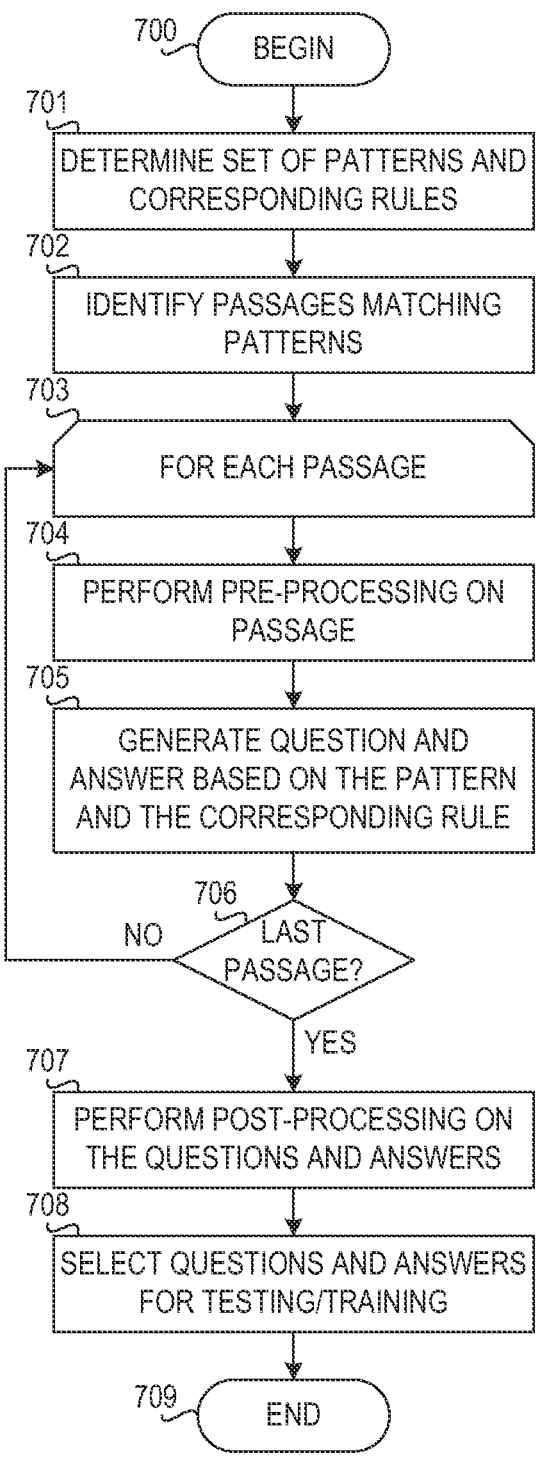
FIG. 7 is a flowchart illustrating operation of a mechanism for automatic generation of test/training questions and answers from a given corpus in accordance with an illustrative embodiment.

FIG. 7 is a flowchart illustrating operation of a mechanism for automatic generation of test/training questions and answers from a given corpus in accordance with an illustrative embodiment. Operation begins (block 700), and the mechanism determines a set of patterns and corresponding question and answer generating rules (block 701). The mechanism identifies passages matching the patterns (block 702).

For each passage matching a pattern (block 703), the mechanism performs pre-processing on the passage (block 704). Pre-processing prepares the passages for application of question and answer generating rules by disambiguating pronouns, redirections, and adding meta attributes to the passage, for example. The mechanism then generates one or more questions and answers from the passage based on the pattern and the corresponding question and answer generating rules (block 705). Then, the mechanism determines whether the passage is the last passage (block 706). If the passage is not the last passage, operation returns to block 703 to consider the next passage.

If the passage is the last passage in block 706, the mechanism performs post-processing on the questions and answers (block 707). The mechanism combines questions and answers and ranks the questions and answers in post-processing. In one embodiment, post-processing includes ordering questions by similarity, merging similar questions with the same answer, scoring similar questions with different answers, and applying an analytic algorithm to the similar questions to resolve conflicts and generate new questions. The mechanism identifies answers for which the confidence conflicts with other highly ranked answers. The mechanism then selects the questions and answers for testing or training (block 708). The mechanism uses a simple number threshold, for example. Alternatively, the mechanism uses other thresholds, such as confidence thresholds. Thereafter, operation ends (block 709).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for automatically generating questions and answers based on any corpus of data. The mechanism, given a collection of textual documents, automatically generates collections of questions about the document together with answers to those questions. The mechanism of the illustrative embodiments attempts to find a comprehensive set of questions and answers in order to enhance the performance of question answering systems by providing these questions and answers for training. In other words, the mechanism acts as an unsupervised learning component for question answering systems.

The mechanism of the illustrative embodiments mines the patterns and identifies rules for each pattern using semi-supervised techniques using a set of criteria. The mechanism arrives at the set of questions and answers by carefully pruning the set of all possible questions and answers. The mechanism of the illustrative embodiments does not require any initial question set as the input.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system configured with a computer readable program that causes the data processing system to implement a question and answer creation system executing on a processor of the data processing system for automatically generating question and answer pairs for training a question answering system for a given domain, the method comprising:
    automatically identifying, by the question and answer creation system executing on the processor of the data processing system, a set of most frequently occurring patterns of components in passages within a corpus of documents for the given domain using an unsupervised technique;
    automatically filtering the set of most frequently occurring patterns to remove frequently occurring patterns that are unlikely to result in meaningful questions based on a domain dictionary to form a filtered set of patterns;
    identifying, by the question and answer creation system, a set of rules that correspond to the filtered set of patterns for generating question and answer pairs from the passages within the corpus of documents;
    storing, by the question and answer creation system, the filtered set of patterns in association with the set of rules in a pattern-rules mapping storage;
    identifying, by the question and answer creation system, an identified set of passages in the corpus that match the filtered set of patterns in the pattern-rules mapping storage;
    performing, by the question and answer creation system, pre-processing on the set of passages to select a subset of the passages in the identified set of passages to be used for generating question and answer pairs to form a selected set of passages, wherein the pre-processing collects metadata attributes of the identified set of passages to select the selected set of passages;
    applying, by the question and answer creation system, the set of rules in the pattern-rules mapping storage to the selected set of passages to generate a set of question and answer pairs;
    performing, by the question and answer creation system, post-processing on the set of question and answer pairs using the metadata attributes to form a final set of question and answer pairs, wherein performing post-processing comprises ordering questions by similarity; merging similar questions with the same answer; scoring similar questions with different answers; and applying an analytic algorithm to the similar questions to resolve conflicts and generate new questions; and
    training a question answering system using the final set of question and answer pairs.

2. The method of claim 1, wherein performing pre-processing comprises collecting the metadata attributes based on syntactic and semantic clues from a document in which each given passage in the set of passages occurs.

3. The method of claim 1, wherein the components of the patterns are selected from a group consisting of: words, part-of-speech tags, named entities, or subject-predicate relations.

4. The method of claim 1, wherein identifying the set of rules utilizes techniques selected from a group consisting of: pronoun disambiguation, anaphora resolution, language linguistics, sentence relationships, frequency, or lexical databases.

5. The method of claim 1, further comprising ranking the generated question and answer pairs and using a high ranked subset of question and answer pairs to train the question answering system.

6. A computer program product comprising a non-transitory computer readable storage medium having a computer readable program stored therein, wherein a computing device configured with the computer readable program implements a question and answer creation system executing on a processor of the computing device for automatically generating question and answer pairs for training a question answering system for a given domain, wherein the computer readable program causes the computing device to:
    automatically identify, by the question and answer creation system executing on the computing device, a set of most frequently occurring patterns of components in passages within a corpus of documents for the given domain using an unsupervised technique;
    automatically filtering the set of most frequently occurring patterns to remove frequently occurring patterns that are unlikely to result in meaningful questions based on a domain dictionary to form a filtered set of patterns;
    identify, by the question and answer creation system, a set of rules that correspond to the filtered set of patterns for generating question and answer pairs from the passages within the corpus of documents;
    store, by the question and answer creation system, the filtered set of patterns in association with the set of rules in a pattern-rules mapping storage;
    identify, by the question and answer creation system, an identified set of passages in the corpus that match the filtered set of patterns in the pattern-rules mapping storage;
    perform, by the question and answer creation system, pre-processing on the set of passages to select a subset of the passages in the identified set of passages to be used for generating question and answer pairs to form a selected set of passages, wherein the pre-processing collects metadata attributes of the identified set of passages to select the selected set of passages;
    apply, by the question and answer creation system, the set of rules in the pattern-rules mapping storage to the selected set of passages to generate a set of question and answer pairs;
    perform, by the question and answer creation system, post-processing on the set of question and answer pairs using the metadata attributes to form a final set of question and answer pairs, wherein performing post-processing comprises ordering questions by similarity; merging similar questions with the same answer; scoring similar questions with different answers; and applying an analytic algorithm to the similar questions to resolve conflicts and generate new questions; and
    train a question answering system using the final set of question and answer pairs.

7. The computer program product of claim 6, wherein performing pre-processing comprises collecting the metadata attributes based on syntactic and semantic clues from a document in which each given passage in the set of passages occurs.

8. The computer program product of claim 6, wherein the components of the patterns are selected from a group consisting of: words, part-of-speech tags, named entities, or subject-predicate relations.

9. The computer program product of claim 6, wherein identifying the set of rules utilizes techniques selected from a group consisting of: pronoun disambiguation, anaphora resolution, language linguistics, sentence relationships, frequency, or lexical databases.

10. The computer program product of claim 6, wherein the computer readable program further causes the computing device to rank the generated question and answer pairs and using a high ranked subset of question and answer pairs to train the question answering system.

11. An apparatus comprising:
a processor; and
a memory coupled to the processor, wherein the memory comprises a computer readable program, wherein the apparatus configured with the computer readable program implements a question and answer creation system executing on the processor for automatically generating question and answer pairs for training a question answering system for a given domain, wherein the computer readable program causes the processor to:
automatically identify, by the question and answer creation system, a set of most frequently occurring patterns of components in passages within a corpus of documents for the given domain using an unsupervised technique;
automatically filtering the set of most frequently occurring patterns to remove frequently occurring patterns that are unlikely to result in meaningful questions based on a domain dictionary to form a filtered set of patterns;
identify, by the question and answer creation system, a set of rules that correspond to the filtered set of patterns for generating question and answer pairs from the passages within the corpus of documents;
store, by the question and answer creation system, the filtered set of patterns in association with the set of rules in a pattern-rules mapping storage;
identify, by the question and answer creation system, an identified set of passages in the corpus that match the filtered set of patterns in the pattern-rules mapping storage;
perform, by the question and answer creation system, pre-processing on the set of passages to select a subset of the passages in the identified set of passages to be used for generating question and answer pairs to form a selected set of passages, wherein the pre-processing collects metadata attributes of the identified set of passages to select the selected set of passages;
apply, by the question and answer creation system, the set of rules in the pattern-rules mapping storage to the selected set of passages to generate a set of question and answer pairs;
perform, by the question and answer creation system, post-processing on the set of question and answer pairs using the metadata attributes to form a final set of question and answer pairs, wherein performing post-processing comprises ordering questions by similarity; merging similar questions with the same answer, scoring similar questions with different answers; and applying an analytic algorithm to the similar questions to resolve conflicts and generate new questions; and
train a question answering system using the final set of question and answer pairs.

12. The apparatus of claim 11, wherein performing pre-processing comprises collecting the metadata attributes based on syntactic and semantic clues from a document in which each given passage in the set of passages occurs.

13. The apparatus of claim 11, wherein the components of the patterns are selected from a group consisting of: words, part-of-speech tags, named entities, or subject-predicate relations.

14. The apparatus of claim 11, wherein identifying the set of rules utilizes techniques selected from a group consisting of: pronoun disambiguation, anaphora resolution, language linguistics, sentence relationships, frequency, or lexical databases.

15. The apparatus of claim 11, wherein the computer readable program further causes the processor to rank the generated question and answer pairs and use a high ranked subset of question and answer pairs to train the question and answering system.

* * * * *